United States Patent [19]

Hays et al.

[11] Patent Number: 5,539,392
[45] Date of Patent: Jul. 23, 1996

[54] METHOD FOR COORDINATING RADIO PAGING TRANSMISSIONS ON LOCAL AND NATIONWIDE CHANNELS

[75] Inventors: William D. Hays, Madison; Bhushan S. Rele, Ridgeland, both of Miss.

[73] Assignee: Mobile Telecommunication Technologies, Jackson, Miss.

[21] Appl. No.: 322,199

[22] Filed: Oct. 13, 1994

[51] Int. Cl.⁶ ..................................................... H04Q 1/00
[52] U.S. Cl. .............................. 340/825.44; 340/825.48; 455/38.1
[58] Field of Search .................. 340/825.44, 825.48; 455/38.1, 38.5; 379/57

[56] References Cited

U.S. PATENT DOCUMENTS

| | | | |
|---|---|---|---|
| Re. 33,417 | 10/1990 | Bhagat et al. | 340/825.44 |
| 4,178,476 | 12/1979 | Frost | 340/825.44 |
| 4,644,347 | 2/1987 | Lucas et al. | 340/825.44 |
| 4,644,351 | 2/1987 | Zabarsky | 340/825.44 |
| 4,881,073 | 11/1989 | Andros | 340/825.44 |
| 4,891,638 | 1/1990 | Davis | 340/825.44 |
| 5,122,795 | 6/1992 | Cubley et al. | 340/825.44 |
| 5,237,321 | 8/1993 | Oliwa | 34-/825.44 |
| 5,254,986 | 10/1993 | DeLuca | 340/825.44 |

*Primary Examiner*—Brian Zimmerman
*Attorney, Agent, or Firm*—Finnegan, Henderson, Farrabow, Garrett & Dunner

[57] ABSTRACT

To ensure that a user of radio paging services receives page messages while traveling, page messages are broadcast over both the user's local paging channel and a nationwide paging channel during periods of scheduled travel. At all other times, page messages are broadcast over the user's local channel and accompanied by tone-only messages of abbreviated length broadcast over the nationwide channel. Receipt of a tone-only message provides user notification that he or she was paged over the local channel. Receiving logic in the pager carried by the user automatically switches the pager between local and nationwide channel frequencies under the control of channel marker codes transmitted over the local channel and a switching code included in tone-only messages received over the nationwide channel. To facilitate system management, all page messages are routed through a nationwide paging terminal.

17 Claims, 3 Drawing Sheets

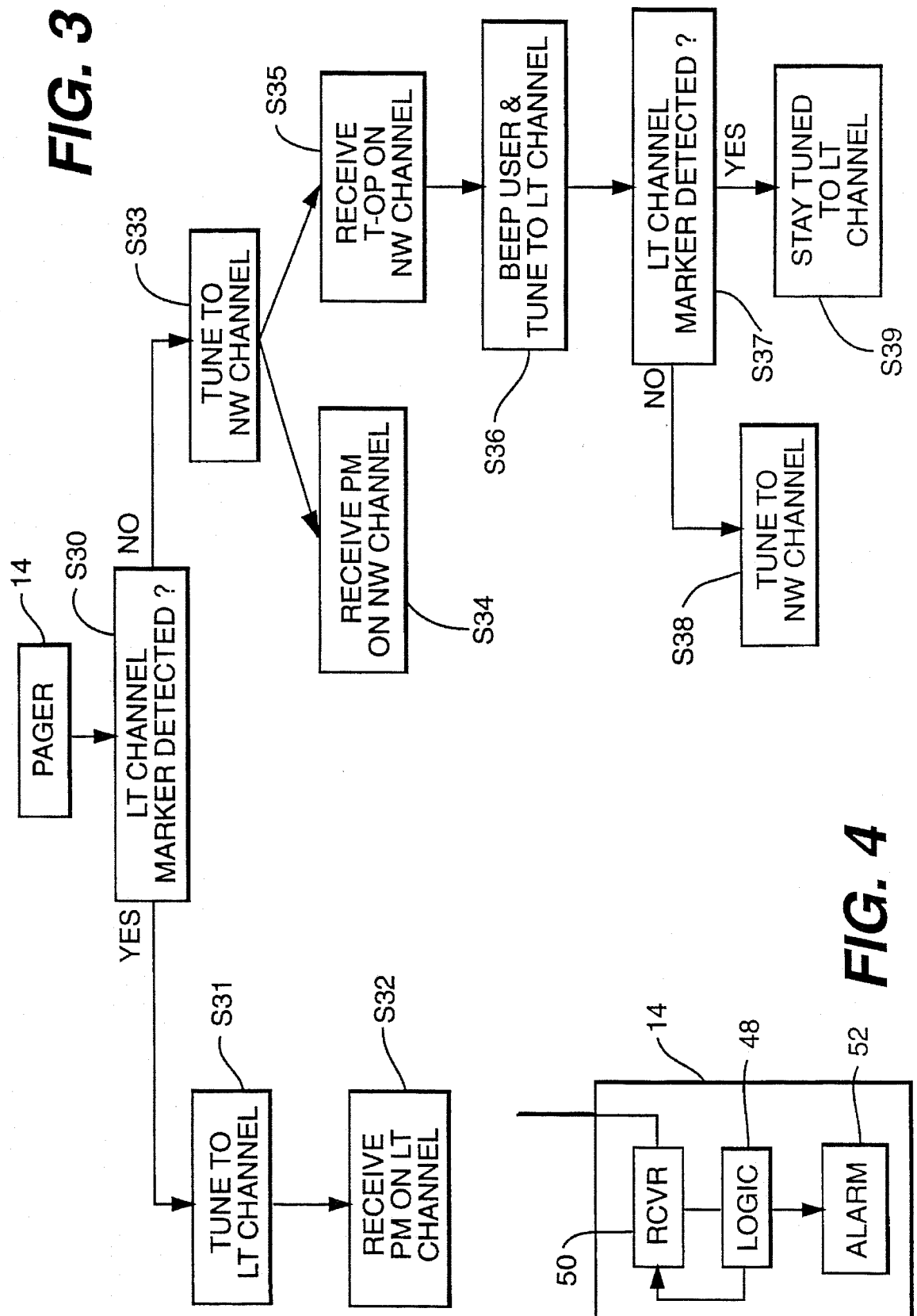

5,539,392

METHOD FOR COORDINATING RADIO PAGING TRANSMISSIONS ON LOCAL AND NATIONWIDE CHANNELS

FIELD OF THE INVENTION

The present invention relates generally to radio paging systems and particularly to a method for enabling users subscribing to a local radio paging system to receive pages while traveling beyond the coverage area of the local radio paging system transmitter.

BACKGROUND OF THIS INVENTION

To accommodate the ever increasing mobility of users of radio pagers, the Federal Communications Commission (FCC) has allocated a number of frequencies in the 900 MHz band as nationwide paging channels. Users carrying pagers tuned to a nationwide channel can then receive personal page messages virtually anywhere in the U.S. However, to alleviate congestion and avoid delays in the nationwide transmissions of page messages, it is desirable to limit use of the nationwide paging channels to page messages for users who are actually traveling beyond the coverage or reception areas of the local paging systems to which they subscribe. It has therefore been proposed to require users to notify their local paging systems that they wish to receive radio page messages while traveling beyond their local reception area during specified travel periods, and only during the specified travel periods will page messages addressed to these traveling users be transmitted over a nationwide Since nationwide paging channels and local paging channels operate at different radio frequencies, a pager user (or subscriber), desiring both local and nationwide service must either carry two pagers, one tuned to a nationwide channel and the other tuned to the user's local channel, or a single pager having the capability of switching between the nationwide and local channel frequencies. Naturally, the channel-switching single receiver is the preferred option for convenience sake. It is also generally preferable that the single pager have automatic channel switching capability, rather than requiring the user to remember to manually switch the pager between the nationwide and local paging channels as appropriate to the user's location.

A prime consideration of all pager users is, of course, that they faithfully receive all page messages addressed to them, regardless of whether they were transmitted over the local channel or a nationwide channel. This requires that users strictly adhere to any travel schedule filed with their local paging system terminal. If a user leaves the local coverage area prior to the scheduled departure time, the user cannot receive page messages because he or she is out of range of the local paging channel, and the page message will not have been transmitted on a nationwide channel. If the user leaves later than the scheduled departure time, page messages will be missed unless the paging receiver is tuned to a nationwide channel. Similarly, a return to the local coverage area ahead of schedule will result in missed page messages, unless the paging receiver is tuned to the nationwide channel, and a late return will result in the failure to receive page messages that were broadcast over the local channel prior to the user's return.

Page messages can also be missed when a user is traveling in the ill-defined outskirts of the local paging terminal's broadcast coverage area. Obviously, if the subscriber strays beyond the local broadcast coverage area, page messages broadcast over the local paging channel will not be received. When the user strays back into the local coverage area, a page message will be missed if the pager had been automatically switched to a nationwide channel frequency.

SUMMARY OF THE INVENTION

It is accordingly an objective of the present invention to provide a radio paging method and apparatus that minimizes the possibility that paging messages will not be received by traveling pager users.

To achieve this objective in accordance with the present invention, each request to page a pager user is accompanied by a determination of whether the user has filed a travel schedule indicating scheduled times of departure from and return to the user's local channel coverage area. Based on a determination that the user should be within the local coverage area, a page message addressed to the subscriber is this local channel broadcast, a wide area, e.g., nationwide, page, comprised of a short, tone-only page also addressed to the subscriber, is broadcast over a nationwide channel.

On the other hand, if it is determined from the filed travel schedule that the user is scheduled to be traveling beyond the local channel coverage area, a page message addressed to the user's pager is broadcast over the wide area channel, as well as over the local channel.

By this coordination of local and wide area channel broadcasts, the user either receives a complete page message or a short, tone-only page notifying the user that he or she has been paged, regardless of time and place.

Further in accordance with the present invention, the user's pager includes automatic channel switching logic programmed to continuously tune the pager to a local channel frequency as long as a channel marker code unique to the user's local paging channel and included in every local page message preamble, is received. If no local channel marker code is detected for a preset time-out interval, the pager is automatically switched to the wide area channel frequency. To automatically switch the pager back to the local area channel frequency, a switching code is encoded into the preamble of each tone-only page that is addressed to the user and broadcast over the wide area channel. Thus, upon reception of a tone-only page, the user is alerted that a page message was transmitted over his or her local channel, and then the pager is switched to the local channel frequency. If the user ha not returned to the local system coverage area, the pager automatically switches back to the wide area channel frequency upon expiration of the preset time-out interval of no receptions of the local channel marker code.

In accordance with another feature of the present invention, all pages are relayed, such as by satellite link, through a wide area paging network prior to transmissions of page messages over both the local and wide area channels and transmissions of page messages over the local channel and tone-only pages over the wide area channel to facilitate system management and time coordination of the page transmissions over the local and wide area channels.

Additional features and advantages of the invention will be set forth in the description which follows, and in part will be apparent from the description, or may be learned by practice of the invention. The objectives and other advantages of the invention will be realized and attained by the method particularly pointed out in the written description and the appended claims, as well as the accompanying drawings.

It will be understood that both the forgoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention and, together with the description, serve to explain the principles of the invention.

BRIEF DESCRIPTION OF THE DRAWINGS

FIG. 3 is a flow chart, in accordance with one embodiment of the present invention, illustrating the operation of a portable radio pager utilized with the system of FIG. 1; and FIG. 4 is a schematic block diagram of a portable radio pager, in accordance with one embodiment of the present invention, programmed to operation in the manner illustrated in FIG. 3.

DETAILED DESCRIPTION OF THE PREFERRED EMBODIMENT

Figure 1:
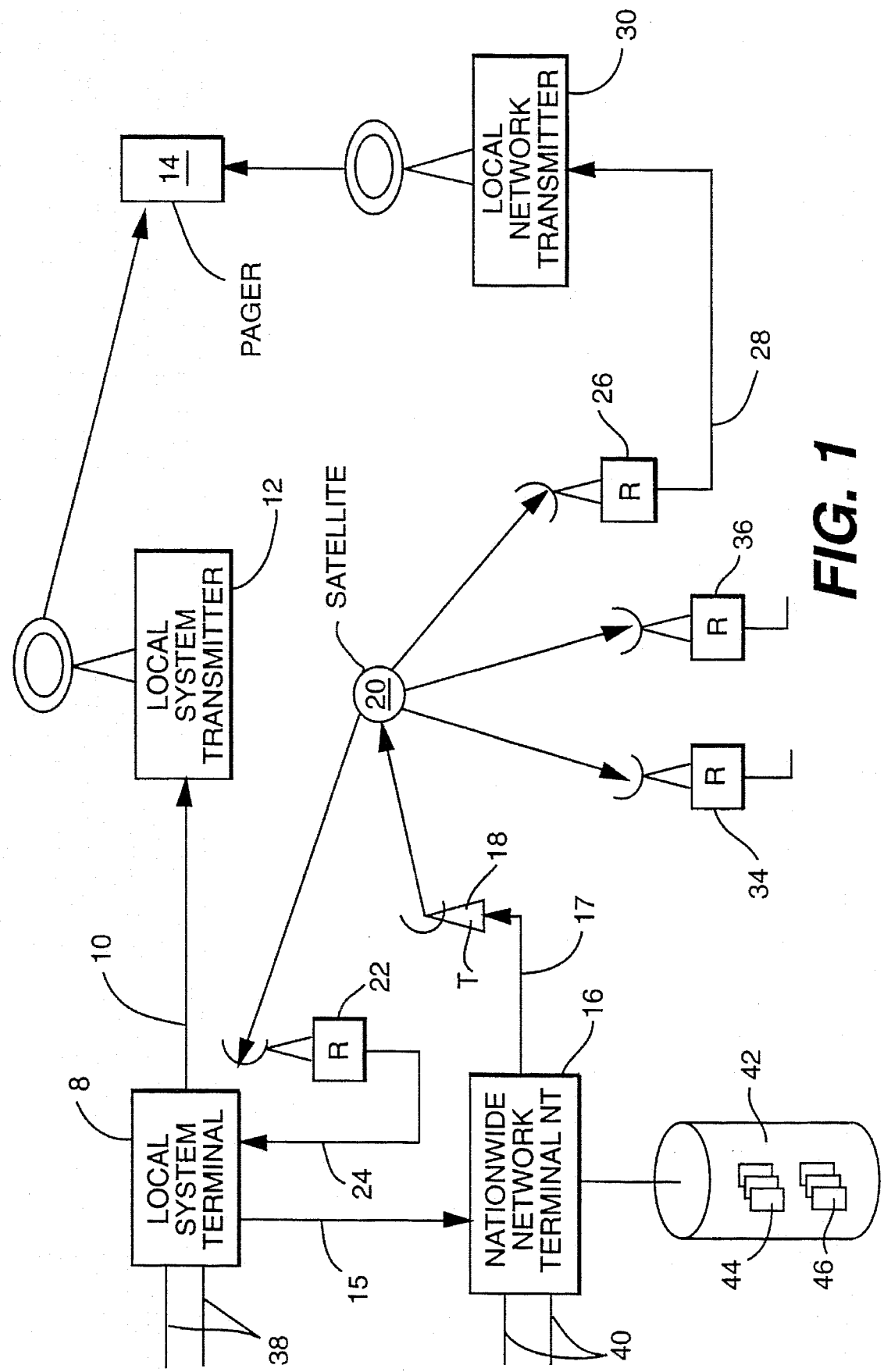
FIG. 1 is a schematic block diagram illustrating a paging system utilized in the practice of one embodiment of the present invention.

In the radio paging system of FIG. 1, a local system terminal 8 is connected by lines 10 to one or more local system transmitters 12, which broadcast page messages at a local channel frequency to a pager 14 located in the broadcast coverage area of the local system. The local system terminal is also connected by a suitable link, such as land-lines 15, to a wide area or nationwide network terminal 16 which, in turn, is connected by lines 17 to a satellite uplink transmitter 18. Paging transmissions received by satellite 20 from uplink transmitter 18 are retransmitted to a nationwide network of downlink receivers, one being a local system receiver 22 connected by lines 24 to local system terminal 8. Another of these downlink receivers is a local network receiver 26 connected by lines 28 to a local network transmitter 30 preferably having essentially the same broadcast coverage as local system transmitters 12. Local network transmitter 30 broadcasts at a nationwide channel frequency in the 900 MHz band, whereas local system transmitters 12 broadcast at a different local channel frequency which may also be in the 900 MHz, band. Downlink receivers 34 and 36 in FIG. 1 represent network receivers situated in local areas geographically dispersed throughout the country.

Still referring to FIG. 1, lines 38 leading into local system terminal 8 represent phone lines over which page requests are phoned into the local paging system. Lines 40 indicate phone lines over which page requests are phoned into nationwide network terminal 16. Reference numeral 42 indicates an appropriate memory in which are stored travel schedules filed by users wishing to receive page messages while traveling beyond the broadcast coverage area of their local paging system. Typically, users call in their travel schedules to their local paging system over phone lines 38. This procedure is represented by step S1 in the flow chart of FIG. 2. Then, in step S2, local terminal 8 sends user travel schedules to nationwide network terminal NT over landlines 15. All travel schedules received by the nationwide network terminal are stored in memory 42, as indicated by step S3, to compile a file of travel schedules as illustrated at 44 in FIG. 1. It will be appreciated that this file includes travel schedules of users subscribing to the paging services not only of local system terminal 8, but also of local system terminals located elsewhere in the country. Rather than phoning travel schedules into local paging systems, travel schedules may be phoned directly into nationwide terminal NT over lines 40 for storage in network memory 42.

To page a particular user subscribing to the paging services of local system terminal 8, a page message is called in over a phone line 38 (Step S4). The local system terminal then assembles the page message into appropriate coded signal format (Step S5). Included in each page message is a channel marker code uniquely identifying the local paging system. As indicated by steps S6 and S7 in FIG. 2, the assembled page message is sent by local terminal 8 over land-lines 15 to nationwide terminal 16 and is stored in network terminal memory 42, as indicated at 46 in FIG. 1. It will be appreciated that, alternatively, page messages may be phoned into nationwide network terminal 16, which then assembles the page message in coded signal format in lieu of local terminal 8 and stores the page messages in network memory 42. While not illustrated, it will be appreciated that a memory may be included with the local terminal 8 as a backup page message storage device to network terminal memory 42.

After receipt of a page message from local terminal 8 or assembly of a page message by network terminal 16, the network terminal determines whether a travel schedule has been filed by the user to whom the page message is addressed. If there is no travel schedule stored in network memory 42 for this particular user, then the network terminal assumes that the user is not traveling and thus is within the broadcast coverage area of local terminal 8. If the user has filed a travel schedule, it is retrieved from network memory 42 by network terminal 16 to determine whether the current time is within the user's scheduled travel period. If the current time falls outside of this scheduled travel period, the network terminal assumes that the user is within the broadcast coverage area of local terminal 8, i.e., the user is "home." However, if the current time falls within the scheduled travel period, network terminal 16 assumes that the user is traveling away from "home." These determinations are made by the network terminal in step S8, illustrated in FIG. 2.

Figure 2:
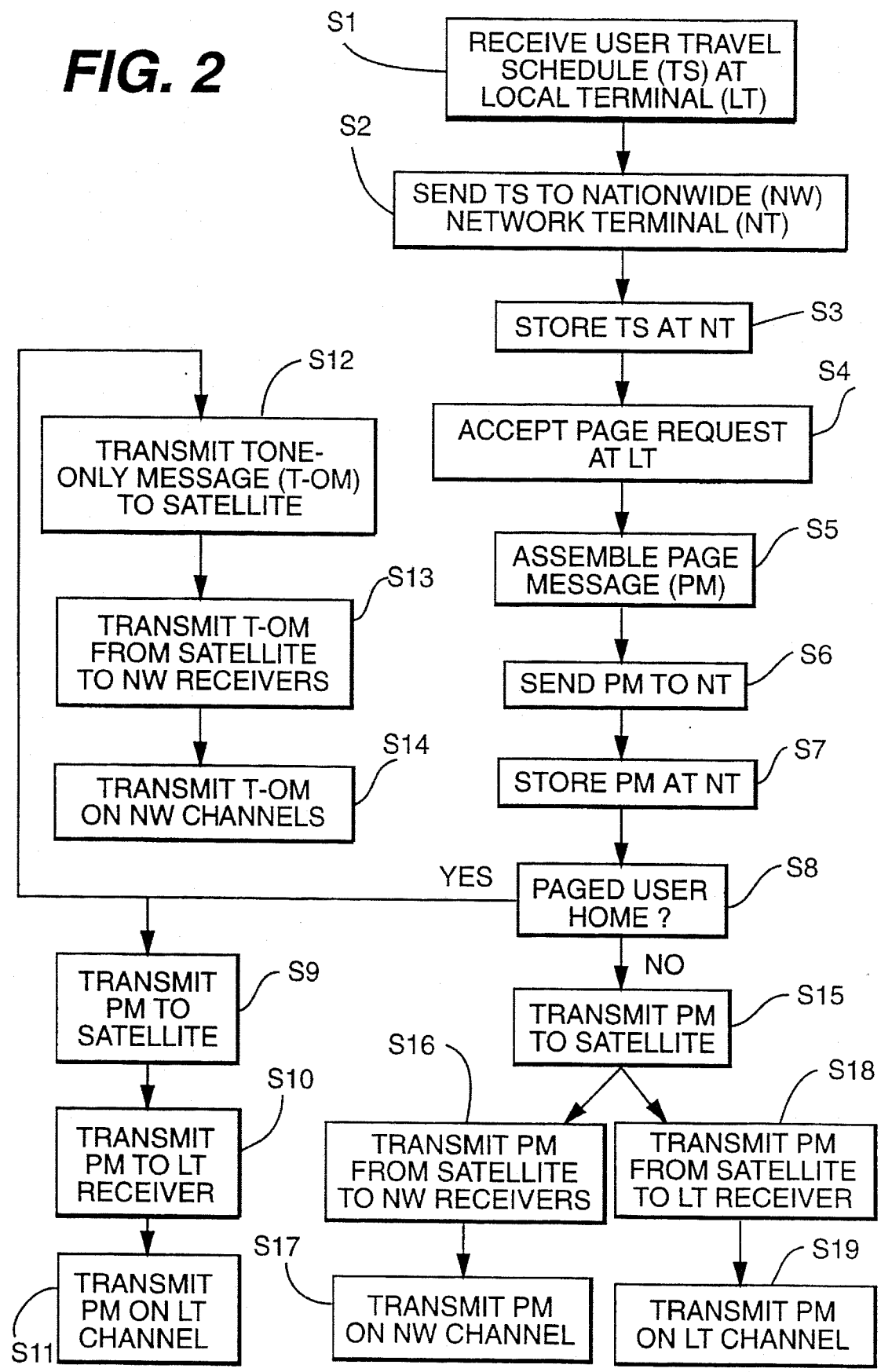
FIG. 2 is a flow chart, in accordance with one embodiment of the present invention, illustrating the various method steps executed by components of the radio paging system illustrated in FIG. 1.

If the network terminal determines that the user should be "home," the page message is retrieved from network memory 42 and transmitted by uplink transmitter 18 of the network terminal to satellite 20 in step S9 of FIG. 2. Satellite 20 then relays the page message to downlink receiver 22 of local terminal 8 (step S10), and, in step S11, the page message is broadcast by local system transmitters 12 over the local channel. If the user's pager 14 is located in the local terminal coverage area, active, and tuned to the local channel frequency, the page message will be received by the user.

In accordance with a feature of the present invention, as a result of the determination that the paged user should be "home," network terminal 16 also causes uplink transmitter 18 to transmit a tone-only page to satellite 20, as illustrated in step S12 of FIG. 2. This tone-only page is retransmitted in step S13 by the satellite to all of the network downlink receivers, including network receiver 26 connected to network transmitter 30, which broadcasts in the local coverage area of local terminal 8. This tone-only page is transmitted by transmitter 30 in step S14 over the nationwide channel with essentially the same broadcast coverage as local transmitters 12. The same tone-only page uniquely addressed to the pager of the user is also received by all other network receivers and is broadcast at the nationwide channel frequency by the network of local network transmitters respectively connected to the downlink receivers, e.g., 34, 36. Consequently, pager 14, if active and tuned to the nationwide channel frequency, will receive this tone-only page regardless of location throughout the country.

This tone-only page is preferably an abbreviated message including a preamble, a pager address, a user alert code, and a channel switching code. Since the tone-only message can be significantly shorter in length than a normal page message, undue congestion of the nationwide channel is avoided. The user alert code causes the pager to alert the user by generating a suitable signal, such as a distinctive beeping tone(s), displayed character(s), etc. This signal notifies the user that a personal page message has been transmitted over the local channel of the local system terminal to which he or she subscribers. In this event, the user preferably calls network terminal 16 over, for example, an 800 phone line 40 and requests that the page message be retransmitted over the nationwide channel.

If, in step S8, network terminal 16 determines from the travel schedule retrieved from network memory 42 that the paged user should be traveling beyond the broadcast coverage area of local terminal 8, the page message is transmitted by network uplink transmitter 18 to satellite 20 in step S15. Satellite 20 then retransmits the page message to all of the local network downlink receivers throughout the country, including network downlink receiver 26 local to the broadcast area of network terminal 8 (step S16). Then, in step S17, the page message is transmitted at the nationwide channel frequency by all of the local network transmitters throughout the country, including local network transmitter 30 having the same broadcast coverage area as local system transmitters 12 of the user's home paging system.

In addition, the page message is transmitted from the satellite to the local terminal downlink receiver 22 of FIG. 1, as represented by step S18. Then, in step S19, the page message is transmitted by the local system transmitters 12 on the local channel of the user's home paging system. In this manner, as long as pager 14 is active and tuned to either the local channel frequency or the nationwide channel frequency, the page message will be received, regardless of the user's location.

To coordinate the channel switching functions of pager 14 with the paging system operation described in conjunction with FIG. 2, pager receiving logic, illustrated at 48 in FIG. 4, is programmed to channel switch the pager in the manner illustrated in the flow chart of FIG. 3. The pager receiving logic continuously looks for the local channel marker code included in the preamble of page messages broadcast by the local transmitters 12 regardless of the pager address included in the page message (step S30). The pager receiving logic 48 continuously monitors page messages broadcast over the local channel and, if the local channel marker code is detected (YES) by the pager receiving logic, the user must be in the local terminal broadcast coverage area, and thus the receiving logic maintains the receiver circuit 50 of pager 14 (FIG. 4) tuned to the local channel frequency, as indicated by step S31. The pager thus receives all page messages broadcast over the local channel that are intended for the user (as represented by step S32).

If, on the other hand, the pager receiving logic does not detect the local channel marker code for a preset, time-out period (NO in step S30) the receiving logic automatically switches the pager receiving circuit to the nationwide channel frequency, as indicated in step S33. Since no local channel marker codes were detected while the pager was tuned to the local channel frequency, it can be assumed that the user is no longer within the broadcast coverage of the local terminal 8. Thus it is appropriate to switch the pager to the nationwide channel frequency (step S33). If, from the user's travel schedule on file with the network terminal, it is determined that the user should have left the local terminal coverage area, the user's page messages will be broadcast over the nationwide channel. Since the pager was switched to the network channel frequency in step S33, the user will receive all page messages broadcast over the nationwide channel (step S34).

If, however, the user's pager receives a tone-only page broadcast over the nationwide channel (step S35) signifying that the user has missed a page message broadcast over the local channel, the pager alerts the user to this fact by activating an alarm 52 (FIG. 4) to generate a beeping tone(s), a display character(s), or a vibration signal upon detection of the user alert code by receiving logic 48 (step S36).

As noted above, also included in the tone-only page is a channel switching code, which, upon recognition by the pager receiving logic, switches the pager to the local channel frequency (step S36). This situation occurs, for example, when the user leaves the local channel coverage area prior to the departure time indicated in the travel schedule on file with the network terminal. Having been alerted that a page message over the local channel has been missed, the user simply calls the network terminal to revise his or her travel schedule such that future page messages will be transmitted over the nationwide channel and preferably requests that the missed page message be retrieved from network memory 42 and retransmitted over the nationwide channel.

As described, the channel switching code included in the tone-only pages causes the pager to switch to the local channel frequency (step 36). The pager receiving logic then looks for the local channel marker code in step S37. However, since the user is beyond the local channel coverage area, the pager will not see local channel marker codes, and consequently the pager automatically switches to the nationwide channel (step S38) to receive retransmission of the page message that was missed, as well as future page messages.

If, on the other hand, the user's departure from the local terminal coverage area is delayed beyond the scheduled departure time, the user's pager will continue to receive the local channel marker codes in local pages and thus remain tuned to the local channel frequency. Consequently, the user will not receive paged messages over the nationwide channel, but will receive the same page messages being broadcast over the local channel.

Should the user's return to the local terminal coverage area be delayed beyond the scheduled return time, the user's pager will not receive page messages since they are now being transmitted over the local channel. However, since the user's pager is tuned to the nationwide channel frequency, the pager will receive the associated tone-only pages and alert the user to the fact that page messages were missed on the local channel. As discussed above, the user then can call the network terminal to file a revised travel schedule and have the missed page messages broadcast over the nationwide channel.

The possibility also exists that the user will return to the local channel coverage area prior to the scheduled return time. Since the user's pager is tuned to the nationwide channel, page messages will be received on that channel up to the time of scheduled return. Thereafter however, the user will be paged over the local channel accompanied by a tone-only page broadcast over the nationwide channel. Since the pager is tuned to the nationwide channel, receipt of the tone-only page first alerts the user to the local page and then switches the pager to the local channel frequency. The user can phone the local terminal or the network terminal to have the local page message rebroadcast over the local channel to which the pager is now tuned. Since the pager receiving logic is now detecting local channel marker codes, the pager will remain tuned to the local channel frequency, as indicated by step S37 in FIG. 3.

In situations where the user is not scheduled to travel, but is straying in and out of the local terminal coverage area, as seen from the foregoing description, the user will receive tone-only pages after straying out of the coverage area and, thus, be notified of the local pages. The user can call either local terminal 8 or network terminal 16 and request that the page message be retransmitted over the local channel or both the local and nationwide channels depending upon anticipated location.

From the foregoing description, it is seen that, by virtue of the present invention, users of radio paging services are assured of receiving either their page messages directly or notifications of the transmissions of their page messages, regardless of time and place. Also, by routing all page messages through the nationwide terminal, system management and administration, e.g., accounting records maintenance, page message storage, and coordination of page message and tone-only page transmissions, etc., are facilitated. In this regard, it will be appreciated that the present invention may be implemented without local terminals 8. That is, the local transmitters 12 and receivers 22 may be stand-alone transceivers. In this case, the local terminal functions described above would be performed by the network terminal 16 on a nationwide basis.

Although the foregoing description relates to one-way paging systems, the present invention can also be implemented in today's two-way messaging systems, such as the National Wireless Network (NWN) being developed by the assignee herein. The NWN system is at least partially described in U.S. patent application Ser. No. 08/124,219, the contents of which are incorporated herein by reference.

It will be apparent to those skilled in the art that various modifications and variations can be made in the method of the present invention without departing from the spirit of the invention. Thus, it is intended that the present invention cover the modifications and variations of this invention provided they come within the scope of the appended claims and their equivalents.

What is claimed is:

1. A paging method comprising the steps of:

storing travel schedules for users;

receiving a page request for one of the users; determining from the stored travel schedules, in response to receipt of the page request, whether the one user is scheduled for travel beyond a page message reception area of a first paging system;

upon a determination that the one user is on scheduled travel:

transmitting a first page message, according to the page request, addressed to the one user over the first paging system and over a second paging system; and upon a determination that the one user is not on scheduled travel:

transmitting the first page message addressed to the one user over the first paging system; and transmitting a second page message addressed to the one user over the second paging system, the second page message being different from the first page message.

2. The method of claim 1, further including the step of formatting the second page message to include a first signal for alerting the one user of the transmission of the first page message over the first paging system.

3. The method of claim 2, further including the steps of:

storing the first page message prior to transmission; and retransmitting the first page message over at least the first paging system, at the request of the one user.

4. The method of claim 3, wherein the first paging system is a local paging system and the second paging system is a network paging system having a wide page message reception area inclusive of the page message reception area of the first paging system.

5. The radio paging method of claim 4, wherein page message transmissions over the local paging system are at a first radio frequency, and page message transmissions over the network paging system are at a second radio frequency.

6. The method of claim 5, wherein, in the formatting step, the second page message is formatted to further include a second signal for changing a tuning frequency of a pager carried by the one user.

7. The method of claim 5, further including the steps of:

repeatedly transmitting a unique channel marker over the local paging system;

tuning a pager carried by the one user from the first radio frequency to the second radio frequency upon failure to receive the channel marker; and turning the pager from the second radio frequency to the first radio frequency in response to reception of the second page message.

8. A method of coordinating broadcasts of page messages over local and wide area broadcast channels, comprising the steps of:

storing travel schedules filed by users of paging services;

assembling first page messages addressed to the users;

determining from the stored travel schedules whether the first page messages are addressed to users scheduled for travel beyond a reception area of the local broadcast channel;

forwarding the first page messages to a transmitter for broadcast over the local broadcast channel;

relaying the first page messages addressed to those users determined to be on scheduled travel to plural wide area network transmitters for broadcast over the wide area broadcast channel covering a wide reception area inclusive of the local terminal transmitter reception area; and assembling second page messages, said second page messages being abbreviated in length relative to the first page messages and addressed to those users determined not to be on scheduled travel;

transmitting, in association with the local channel broadcasts of first page messages addressed to those users determined not to be on scheduled travel, the second page messages by the plural network transmitters over the wide area channel to alert the users of the local channel broadcasts of the first page messages addressed to them.

9. The method of claim 8, further including the steps of;

repeatedly transmitting a unique channel marker over the local broadcast channel; and formatting the second page messages to include a channel switching code, whereby pagers carried by the users automatically switch to a frequency of the wide area channel upon failure to repeatedly receive the channel marker and to automatically switch from the wide area channel frequency to the local channel frequency upon receipt of the second page messages.

10. The method of claim 9, wherein the page message relaying step is conducted by satellite link.

11. The method of claim 10, wherein the page message forwarding step is also conducted by satellite link.

12. The method of claim 9, further including the step of storing the first page messages for rebroadcast over at least the local broadcast channel upon request by the users.

13. A radio paging system comprising:
   a local paging system including a local transmitter broadcasting over a local channel at a first frequency;
   a network paging system including a network terminal and a plurality of geographically dispersed network transmitters broadcasting over a network channel at a second frequency;
   a memory for storing travel schedules for users of paging services of the local paging system;
   first means for assembling first page messages addressed to the users;
   means for determining from the stored travel schedules which of the first page messages are addressed to first users scheduled for travel beyond a reception area of the local transmitter and which of the first page messages are addressed to second users not scheduled for travel beyond the reception area of the local transmitter;
   second means for assembling second page messages addressed to the second users the second pate messages differing from the first page messages;
   means for relaying those first page messages addressed to the first users from the network terminal to the local transmitter for broadcast over the local channel and to the plurality of network transmitters for broadcast over the network channel and for relaying those first page messages addressed to the second users from the network terminal to the local transmitter for broadcast over the local channel and for relaying the second page messages to the network transmitters for broadcast over the network channel, the second page messages including a signal for alerting the second users of local channel broadcasts of first page messages addressed to them.

14. The system of claim 13, therein the relaying means comprises a satellite link including an uplink network transmitter, a downlink local receiver connected to the local transmitter, and a plurality of downlink network receivers respectively connected to the plurality of network transmitters.

15. The system of claim 13, wherein the first page messages broadcast over the local channel include a marker signal, receptions of the marker signal by pagers carried by the first and second users cause the pagers to tune to the first frequency and a lack of reception of the marker signal causes the pagers to tune to the second frequency, and the second page messages include a switching signal, receptions of the switching signal cause the pagers to tune to the second the first frequency.

16. The system defined in claim 15, wherein the second page messages include an alert signal, the receptions of which initiate an alarm alerting the second users to local channel broadcasts of first page messages addressed to them.

17. A portable radio pager for use with a radio paging system operating to broadcast page messages addressed to travelling pager users over a local channel at a first frequency and over a wide area network channel at a second frequency and to broadcast page messages addressed to non-travelling users over the local channel at the first frequency and associated tone-only pages addressed to the non-travelling users over the network channel at the second frequency, the pager comprising:
   receiver circuitry capable of being tuned to either the first frequency or the second frequency to receive the page messages and the tone-only pages;
   a receiving logic circuit connected to the receiver circuitry for detecting channel marker signals broadcast over the local channel and for detecting a channel switching signal and an alert signal included in each tone-only page broadcast over the network channel, the receiving logic circuit operating to tune the receiver circuitry to the second frequency upon failure to detect channel marker signals during a time-out interval and to tune the receiver circuitry to the first frequency upon detection of the channel switching signal in a received tone-only page; and
   an alarm connected to the receiving logic circuit for emitting a signal, upon detection by the receiving logic circuit of the alarm signal in the received tone-only page, to alert the user to the broadcast over the local channel of a page message addressed to the user.

* * * * *

UNITED STATES PATENT AND TRADEMARK OFFICE
CERTIFICATE OF CORRECTION

PATENT NO. : 5,539,392
DATED : July 23, 1996
INVENTOR(S) : William D. Hays et al.

It is certified that error appears in the above-indentified patent and that said Letters Patent is hereby corrected as shown below:

Claim 13, column 9, line 35, "pate" should read --page--.

Claim 15, column 10, line 14, delete "the second".

Signed and Sealed this

Third Day of December, 1996

Attest:

BRUCE LEHMAN

*Attesting Officer*           *Commissioner of Patents and Trademarks*